No. 774,978. PATENTED NOV. 15, 1904.
M. G. BUNNELL.
DUMPING WAGON.
APPLICATION FILED APR. 28, 1904.
NO MODEL. 8 SHEETS—SHEET 3.

No. 774,978. PATENTED NOV. 15, 1904.
M. G. BUNNELL.
DUMPING WAGON.
APPLICATION FILED APR. 28, 1904.
NO MODEL. 8 SHEETS—SHEET 5.

Witnesses:
Robert H. Weir
J. B. Weir

Inventor:
Morton G. Bunnell
By Buckley & Durand
Attys.

No. 774,978. PATENTED NOV. 15, 1904.
M. G. BUNNELL.
DUMPING WAGON.
APPLICATION FILED APR. 28, 1904.
NO MODEL. 8 SHEETS—SHEET 6.

No. 774,978.　　　　　　　　　　　　　　　　　　　Patented November 15, 1904.

UNITED STATES PATENT OFFICE.

MORTON G. BUNNELL, OF CHICAGO, ILLINOIS, ASSIGNOR TO WESTERN WHEELED SCRAPER COMPANY, OF AURORA, ILLINOIS.

DUMPING-WAGON.

SPECIFICATION forming part of Letters Patent No. 774,978, dated November 15, 1904.

Application filed April 28, 1904. Serial No. 205,271. (No model.)

*To all whom it may concern:*

Be it known that I, MORTON G. BUNNELL, a citizen of the United States of America, and a resident of Chicago, Cook County, Illinois, have invented a certain new and useful Improvement in Dumping-Wagons, of which the following is a specification.

My invention relates to dumping-wagons of that particular type in which the bottom of the wagon-box is composed of two longitudinally-extending and downwardly-swinging bottom-sections which are hinged at their outer edges, so as to permit them to swing downwardly and outwardly in dumping the load, and which are raised and lowered by means of suitably-operated chains or other like flexible connections.

Generally stated, the object of my invention is the provision of an improved and highly efficient dumping-wagon of the foregoing character.

A special object is the provision of improved means for causing the two downwardly-swinging bottom-sections to rise bodily when released or lowered, so as to enable each section to practically lift itself automatically away from the ground and away from the load dumped from the wagon.

Another object is to provide an improved construction and arrangement whereby it will not be necessary to bring the load into contact with any of the operating or suspending chains.

A further object is to provide an improved construction and arrangement whereby the weight of the swinging bottom-sections may practically be sustained entirely by suspending-chains and not by the hinges or flexible connections, nor even to any great extent by the operating-chains or means for pulling the swinging bottom-sections together, as will hereinafter more fully appear.

Another object is to provide an improved construction and arrangement whereby the bottom-sections will be held tightly against the lower edges of the box and also tightly against each other at their inner edges.

It is also an object to provide certain details and features of improvement tending to increase the general efficiency and serviceability of dumping-wagons of this particular character.

To the foregoing and other useful ends my invention consists in matters hereinafter set forth and claimed.

In the accompanying drawings.

Figure 1:
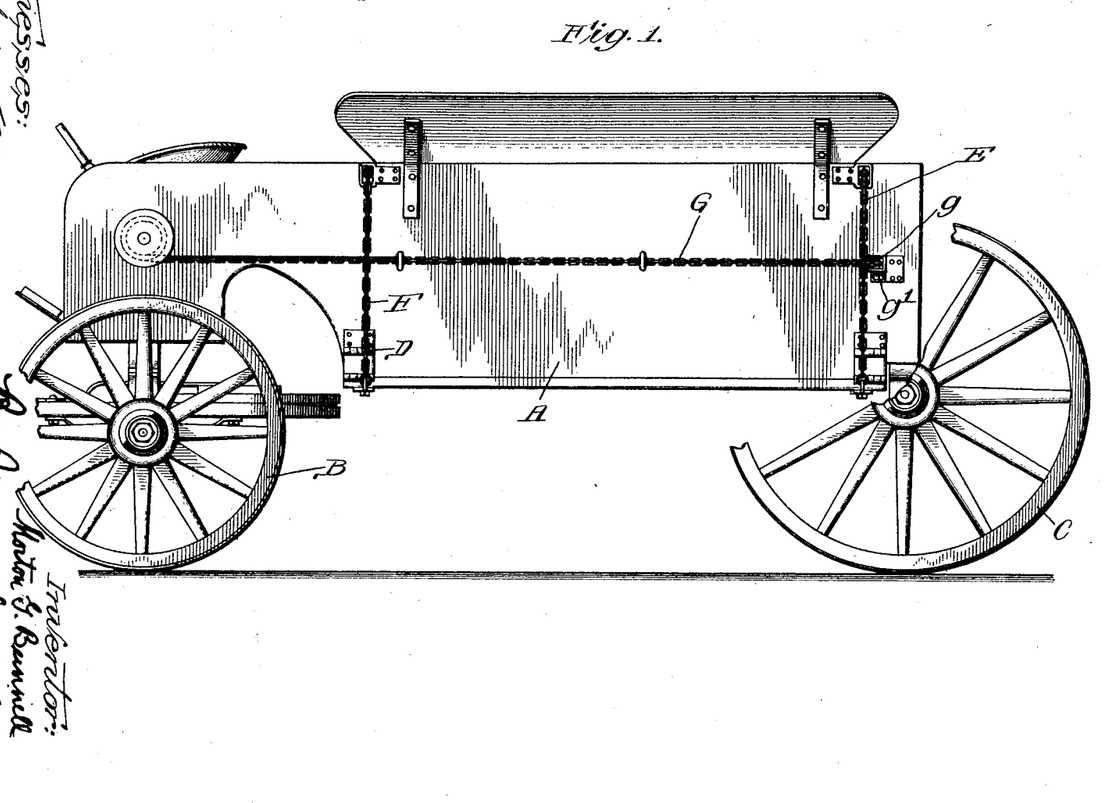
Figure 1 is a side elevation of a dumping-wagon embodying the principles of my invention.
Figure 2:
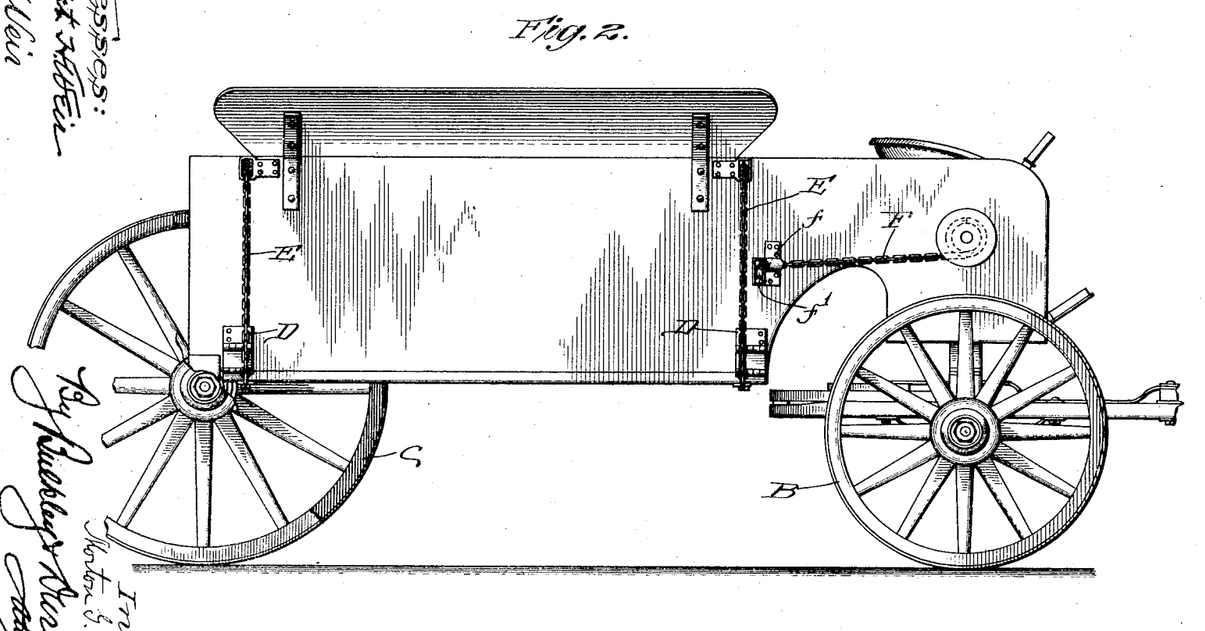
Fig. 2 is a similar view showing the other side of the wagon.
Figure 3:
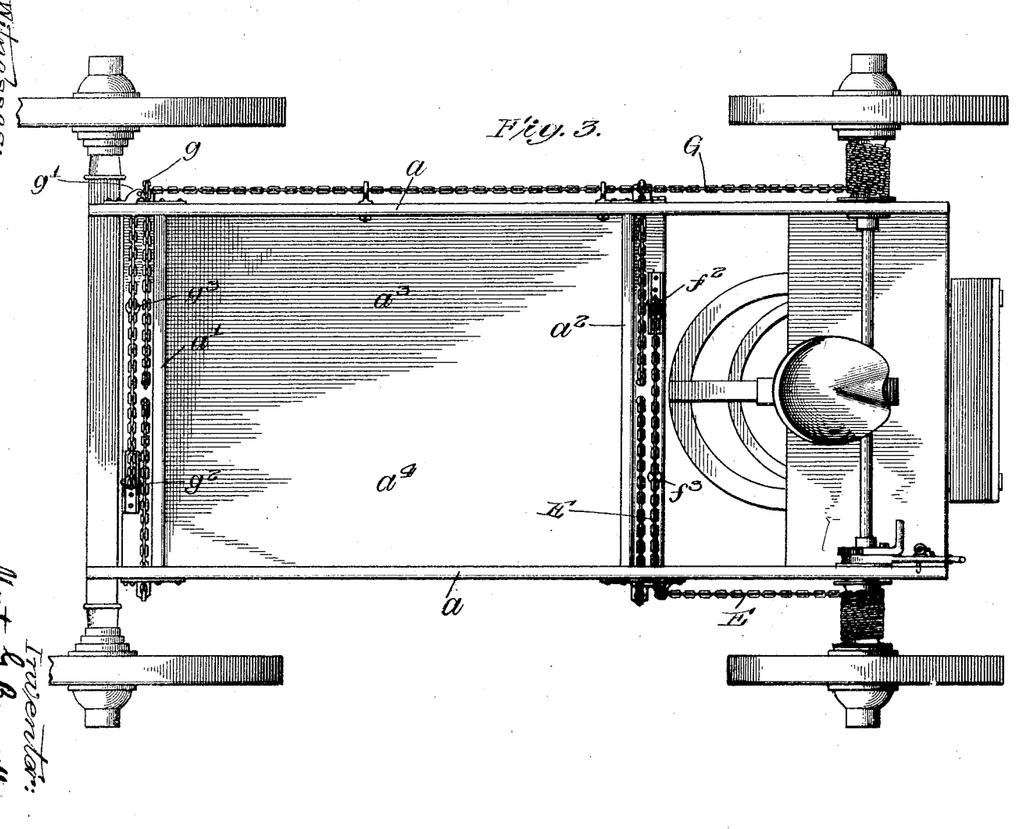
Fig. 3 is a plan of the same.
Figures 4, 5:
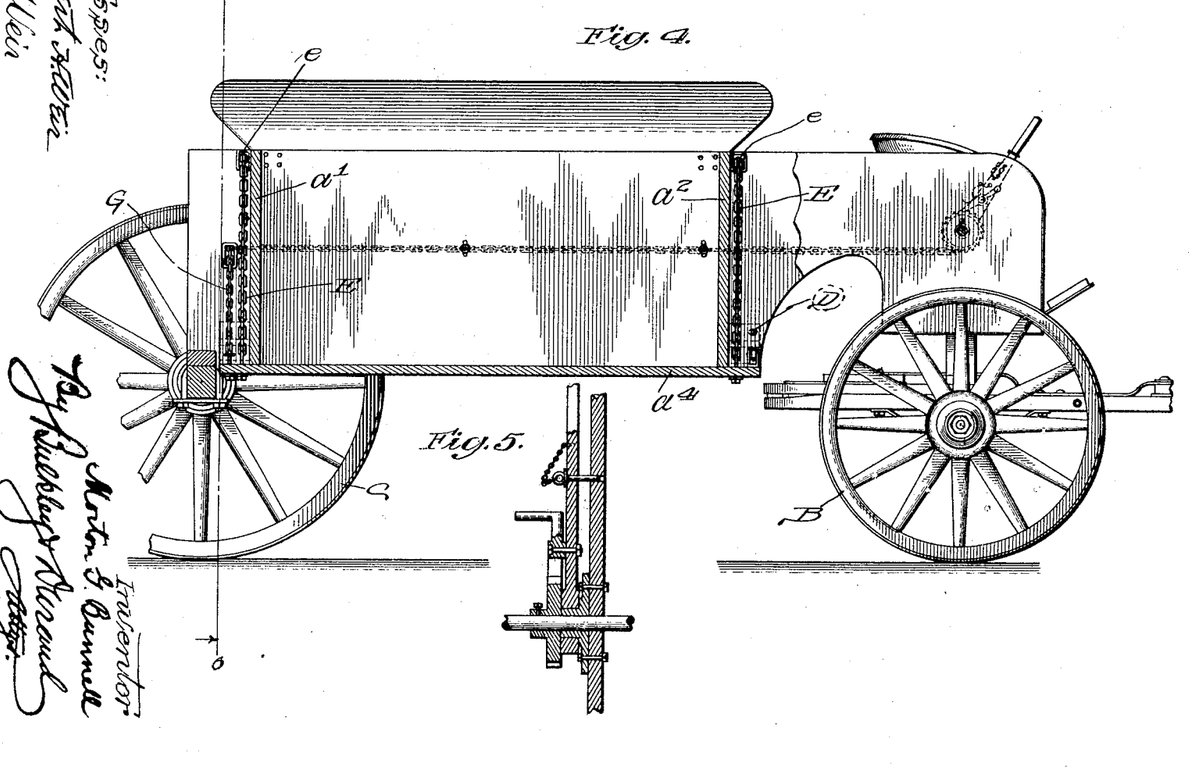
Fig. 4 is a longitudinal section of the said wagon.
Fig. 5 is detail vertical section of the ratchet mechanism for operating the winding-drum to which the end portions of the operating-chains are secured.
Figure 6:
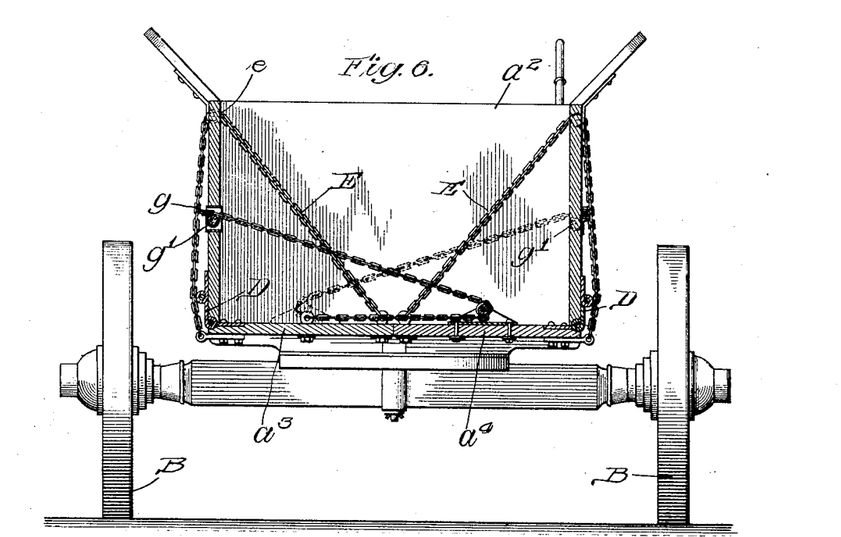
Fig. 6 is a cross-section on line 6 6 in Fig. 4.
Figure 7:
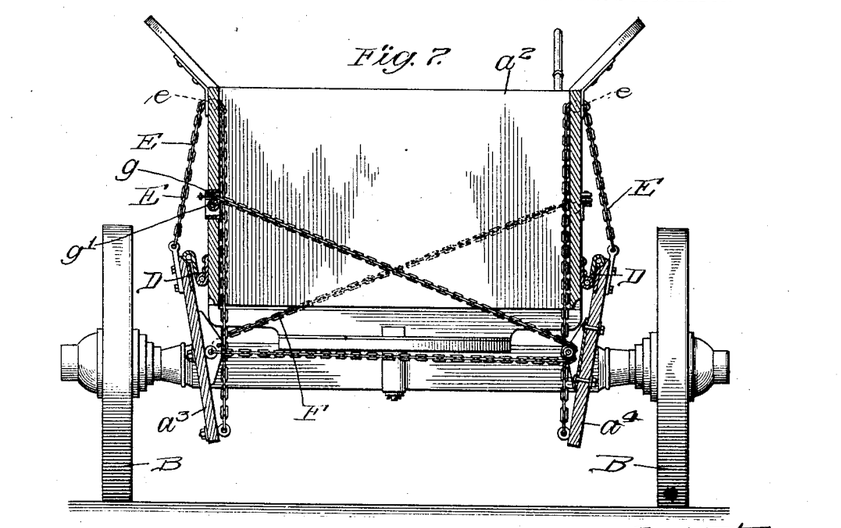
Fig. 7 is a similar view with the exception that in this figure the swinging bottom-sections are opened or lowered instead of closed.
Figure 8:
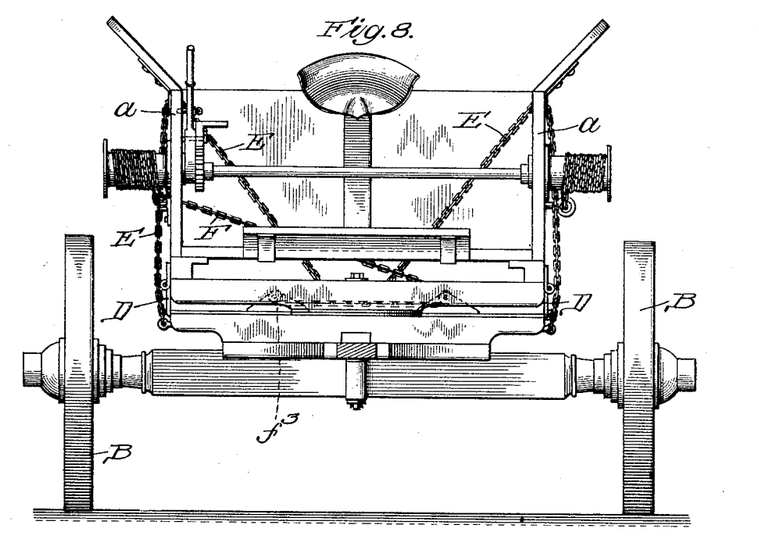
Fig. 8 is a front end elevation of the wagon shown in Fig. 1.
Figure 9:
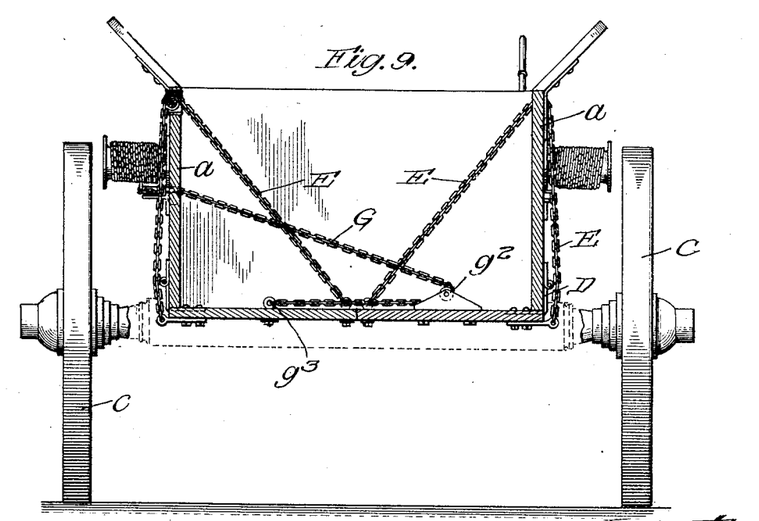
Fig. 9 is a rear end elevation of the said wagon.
Figures 11, 12, 13:
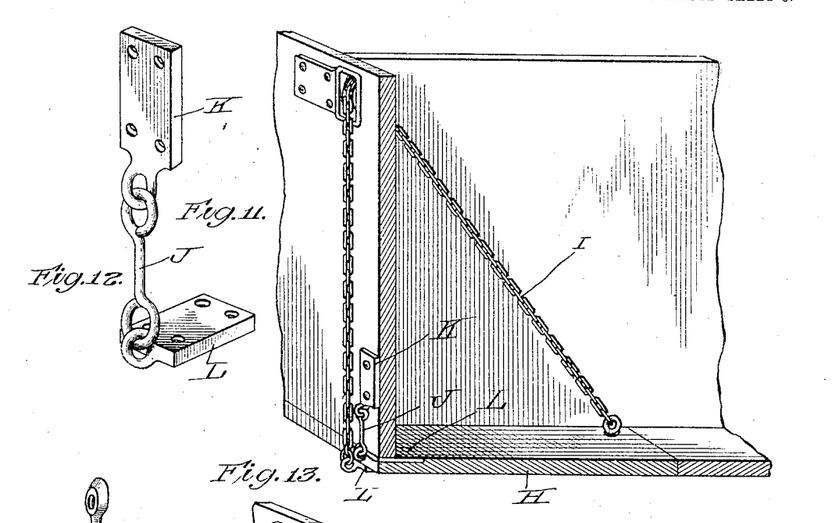
Figs. 11 and 12 show another form of hinge or flexible connection between the bottom-sections and the wagon-box.
Figs. 13 and 14 show still another form of connection between the bottom-sections and the wagon-box.

The dumping-wagon thus illustrated is of that kind in which a box or body A of any suitable or desired construction is supported upon front and rear vehicle-wheels B and C in any suitable manner, as shown in Figs. 1 to 9, inclusive, and Figs. 11 and 13. The box or body comprises side-boards $a$ and end boards $a'$ and $a^2$, together with swinging and longitudinally-disposed bottom-sections $a^3$ $a^4$. As shown in Figs. 6 and 7, for example, these swinging bottom-sections are connected at their outer edges with the side-boards through the medium of double hinges D—that is to say, hinges having two or more points of flexibility—whereby the said sections may be raised to the positions shown in Fig. 6, or, on the other hand, lowered and then automatically lifted bodily to the positions shown in Fig. 7. The means for causing such automatic lifting or raising of the bottom-sections when they are released and allowed to swing down under the weight of the load comprise suspending-chains E, there being preferably four in number, arranged, as shown, outside of the end boards of the box or body. Each suspending-chain has its outer end secured in any suitable manner to the outer edge of one of the bottom-sections and its inner end secured in any suitable way to the inner edge or marginal portion of the same bottom-section. In this way each suspending-chain has its opposite ends secured, respectively, to the outer and inner edges of the same bottom-section. Furthermore, as will be observed, these suspending-chains are arranged to run over small sheaves or suitably-formed rolls $e$, which latter are mounted in suitable manner in the upper portions of the two side-boards. The two operating-chains F and G are extended rearwardly, the chain F extending around and over the sheaves $f$ and $f'$ in one side-board and thence around a sheave $f^2$, mounted on the bottom-section $a^3$ and thence to an end fastening $f^3$ on the bottom-section $a^4$. In a similar way the chain G extends rearwardly over and around the sheaves $g$ and $g'$ at the rear corner of the box and thence across the back of the box or body and around a sheave $g^2$ on the bottom-section $a^4$ and thence to an end fastening $g^3$ on the bottom-section $a^3$. The forward ends of these operating-chains F and G can be pulled in and paid out, so as to alternately open and close the bottom of the wagon through the medium of any suitable arrangement. For example, the forward ends of these operating-chains can be wound upon a rotary drum arrangement, substantially as shown, operated by the ratchet device shown in Figs. 4 and 5. Thus when the operating-chains are wound up the bottom-sections are drawn into the position shown in Fig. 6; but when these operating-chains are unwound or paid out then the weight of the load is sufficient to swing the bottom-sections downward and outward, and during such movement the chains E serve to automatically lift or raise the bottom-sections bodily into the positions shown in Fig. 7. In this way the bottom-sections in opening swing down and then automatically move upward away from the ground and away from the load dumped from the wagon. This obviously increases the clearance between the edges of the bottom-sections and the ground and between the bottom-sections and the load which has been dumped beneath the wagon.

Figure 10:
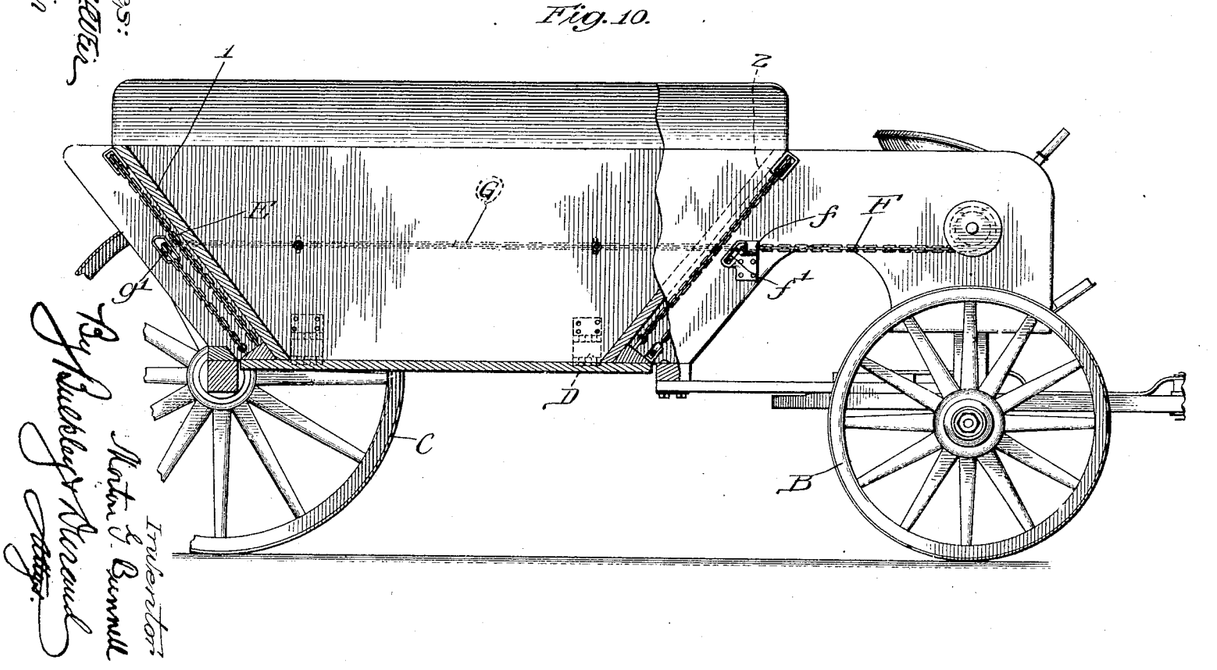
Fig. 10 shows a dumping-wagon with a somewhat different form of box or body.

In Fig. 10 the construction, as far as the arrangement of the chains and hinges is concerned, is practically the same as in the preceding figures. In Fig. 10, however, it will be seen that the end boards 1 and 2 are inclined, so as to shorten the wheel-base of the wagon; but otherwise, as stated, the arrangement and operation of the bottom-sections are substantially the same as in the preceding figures.

In Figs. 11 and 12 a bottom-section H is shown suspended in place by a suspending-chain I, similar to the suspending-chains already described; but in this case the bottom-section is connected with the side-board through the medium of connections somewhat different from those shown in Figs. 1 to 9, inclusive. In Figs. 11 and 12 each hinge connection consists of a link J, having each end provided with an eye adapted to engage similar eyes formed, respectively, on brackets K and L, the former being mounted on the side of the box and the latter secured to the bottom-section. With connections of this character the bottom-sections can be raised and lowered, as previously described; but in addition each bottom-section is capable when lowered of more or less end movement, the connections being flexible in all directions, so to speak.

Figure 14:
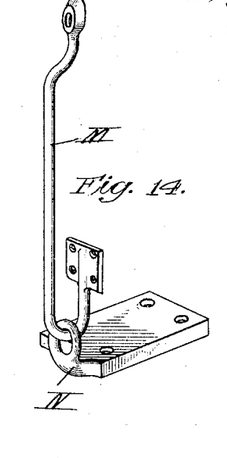

In Figs. 13 and 14 still another form of connection between the bottom-section and the side of the box is shown, each connection consisting of a rod or guide M, secured to the side of the box or body, together with an eye N, secured to the bottom-section and adapted to slide up and down on the said rod.

Thus it will be seen that the suspending-chains may carry the load—that is to say, the weight of the load and the bottom-sections may be practically sustained entirely by the suspending-chains, thereby making it unnecessary for the hinges or flexible connections to withstand any strain or weight incident to the use of the wagon in carrying or dumping different kinds of material. Of course it will be understood that the operating-chains sustain the strains incident to holding the loaded bottom-sections together at their inner edges; but at the same time it is evident that the bottom-sections would be upheld even though the hinges or flexible connections at the outer edges of the sections were not present, and for this reason the suspending-chains may, as stated, practically carry the load. The operating-chain also, of course, serve as part of the means for holding the load in the wagon, inasmuch as it is evident that the load must fall as soon as the operating-chains are released, although the hinges can be dispensed with. In fact, the said hinges or flexible connections are more in the nature of guiding connections, inasmuch as they are necessary simply for the purpose of guiding the outer edges of the bottom-sections outwardly and upwardly outside of the side-boards. Furthermore, it will be seen that all of the chains are outside of the wagon-box, thereby making it unnecessary to bring the load into contact with any of the chains or connections. That said suspending-chains, which, as illustrated, constitute the means for enabling the bottom-sections to automatically lift themselves bodily after being swung down or opened, are peculiarly and clearly effective in so doing is evidenced by the fact that the weight of the load on the inner ends of these suspending-chains is converted into an upward pull on the outer edges of the bottom-sections. Thus the weight of the load is utilized to afford a positive upward pull on the outer edges of the bottom-sections, so as to enable the latter to automatically lift themselves away from the ground and away from the load. With further respect to the operating-chains it will be seen that these chains by reason of their horizontal or practically horizontal arrangement at the ends of the bottom-sections effectively pull the inner edges of these sections together, and thus effect a tight closure of the bottom of the box. With further respect to the suspending-chains and the articulated or guiding connections between the outer edges of the bottom-sections and the sides of the box the arrangement is preferably such that the said sections are caused to rise bodily outside of the box.

It will be understood that by "chain," as herein described, I mean any suitable flexible connection.

Obviously the load must fall as soon as the operating-chains are relaxed, as the suspending-chains, although capable of upholding the load as long as the operating-chains bind the inner edges of the bottom-sections together, have only a running connection, so to speak, with the body of the wagon and in view of the further fact that the points where the suspending-chains rest on the supporting means are directly over the outside edges of the swinging bottom-sections and whereby the bottom-sections naturally and inevitably seek their centers of gravity as soon as they are released by the operating-chains.

I claim as new and desire to secure by Letters Patent—

1. A dumping-wagon comprising a box provided with bottom-sections hinged at their outer edges and hung on suspending-chains whereof each chain has its opposite ends attached to the same bottom-section.

2. A dumping-wagon comprising a box provided with bottom-sections swingingly connected at their outer edges with the sides of the box and hung on suspending-chains running over the sides of the box and each attached at its opposite ends to the same bottom-section.

3. A dumping-wagon comprising a box, bottom-sections suitably connected at their outer edges with the sides of the box, chains running over the sides of the box and each attached at opposite ends to the same bottom-section, and other chains for controlling the opening and closing of said bottom-sections.

4. A dumping-wagon comprising a box provided with bottom-sections, chains running over the sides of the box and each attached at opposite ends to the same bottom-section, and means for controlling the opening and closing of said bottom-sections, said chains acting to lift the bottom-sections outside of the box.

5. A dumping-wagon comprising a box, swinging bottom-sections for said box, a chain running along one side of the box and around a sheave on the far bottom-section and attached at its end to the near bottom-section, and a second chain located at the opposite side of the box and running around a sheave on the far bottom-section and attached at its end to the near bottom-section.

6. A dumping-wagon comprising a box provided with bottom-sections connected at their outer edges so as to swing down and then rise bodily, connections extending upwardly from the outer edges of the bottom-sections over the sides of the box and down to the said sections, whereby the weight of the load is converted into an up-pull on the outer edges of the bottom-sections, when the latter are released, and other chains for controlling the opening and closing of said sections.

7. A dumping-wagon comprising a box provided with bottom-sections, straight links having their upper ends swingingly connected with the sides of the box and their lower ends swingingly connected with the outer edges of the bottom-sections, whereby said links swing upside down, or practically so, to permit the bottom-sections to rise bodily when released, and means for controlling the opening and closing of said sections, and for producing said bodily movement.

8. A dumping-wagon comprising a box, eyes secured to the sides of the box, there being bottom-sections for the box, eyes secured to the outer edges of said sections, straight links connecting the eyes on the sides with the eyes below on the bottom-sections, said links being adapted to swing relatively to both the sides and the bottom-sections, and means for causing the sections, when opened, to rise bodily at the sides of the box.

9. A dumping-wagon comprising a box, sheaves mounted in the sides of the box, there being longitudinally-disposed and downwardly and outwardly swinging bottom-sections for the box, said sections being free to rise bodily outside of the box when opened, and chains running over said sheaves, each chain having one end attached to the outer edge of a bottom-section and its other end attached to the inner portion of the same section, whereby the weight of the load is utilized in lifting the sections bodily outside of the box when the same are opened.

10. A dumping-wagon comprising a box provided with bottom-sections adapted to open and close, and thereby adapted to either dump or carry the load, and connections through which the weight of the load in dumping exerts an upward pull to lift the sections bodily outside of the box, and whereby said bottom-sections when lifted are supported by said connections and adapted to retain their elevated positions until manually closed.

11. A dumping-wagon comprising a box provided with bottom-sections suitably mounted for opening and closing the bottom of the box, and a flexible connection extending around a member on one section and secured at its end to the other section, whereby a tightening of said connection serves to draw the inner edges of said sections tightly together.

12. A dumping-wagon comprising a box provided with parallel and downwardly-swinging bottom-sections, a sheave on one section, and a flexible connection extending around said sheave and secured at its end to the other section, whereby the tightening of said connection serves to draw the inner edges of said sections tightly together.

13. A dumping-wagon comprising a box provided with parallel and downwardly-extending swinging bottom-sections, suitable connections extending between said bottom-sections and adapted when tightened to pull in a horizontal, or practically horizontal, direction, and thereby draw the meeting edges of said sections tightly together.

14. A dumping-wagon comprising a box provided with parallel bottom-sections adapted to swing downwardly, suspending-chains mounted outside of the box and each connected at opposite ends with the same bottom-section, and thereby adapted to lift said sections bodily when the load is dumped, and other chains or like flexible connections for operating said sections.

15. A dumping-wagon comprising a box provided with a pair of parallel downwardly-swinging bottom-sections, double-hinged connections between the outer edges of said sections and the sides of the box, suspending-chains running over the sides of the box and each having its opposite ends secured to the same section, whereby the sections are lifted bodily outside of the box when the load is dumped, and means for controlling the opening and closing of said sections.

16. A dumping-wagon comprising a box provided with bottom-sections adapted to swing downwardly, connections between the outer edges of the sections and sides of the box adapting the sections to swing longitudinally when released, suspending-chains each having its opposite ends secured to the same section, whereby the sections are caused to rise bodily at the sides of the box when the load is dumped, and means for operating said sections.

Signed by me at Chicago, Cook county, Illinois, this 26th day of April, 1904.

MORTON G. BUNNELL.

Witnesses:
SEVERINUS B. CHABOWSKI,
WM. A. HARDENS.